United States Patent

Miller et al.

Patent Number: 6,024,775
Date of Patent: Feb. 15, 2000

[54] SEALED CASE WITH CLOSED-CYCLE FILTER SYSTEM

[76] Inventors: Jack V. Miller; Ruth Ellen Miller, both of R.R. 4 Box 748, Seaford, Sussex County, Del. 19973

[21] Appl. No.: 08/906,987

[22] Filed: Aug. 6, 1997

[51] Int. Cl.[7] .................................................. B01D 29/00
[52] U.S. Cl. ........................ 55/385.1; 55/385.4; 312/114
[58] Field of Search .............................. 55/279, 103, 124, 55/385.1, 385.4; 312/1, 114, 236

[56] References Cited

U.S. PATENT DOCUMENTS

| | | |
|---|---|---|
| 1,642,577 | 9/1927 | Carson . |
| 3,148,956 | 9/1964 | Hetherwick et al. . |
| 4,666,479 | 5/1987 | Shoji . |
| 4,938,750 | 7/1990 | Leise, Jr. ............................... 55/385.4 |
| 4,951,555 | 8/1990 | Hahn . |
| 4,957,518 | 9/1990 | Brassell ................................. 55/385.4 |
| 5,127,718 | 7/1992 | Paine . |

FOREIGN PATENT DOCUMENTS

| | | | |
|---|---|---|---|
| 0046137 | 2/1982 | European Pat. Off. .............. 55/385.4 |
| 2015934 | 10/1971 | Germany ............................. 55/385.4 |
| 53-130578 | 11/1978 | Japan ......................................... 96/59 |
| 533339 | 2/1941 | United Kingdom ..................... 55/279 |
| 1094832 | 12/1967 | United Kingdom ..................... 55/279 |

OTHER PUBLICATIONS

Leverett, IBM Technical Disclosure Bulletin, "Fast Response Gas Buffer for Glove Box", vol. 20, No. 12, May 1978.

*Primary Examiner*—Jay H. Woo
*Assistant Examiner*—Minh-Chau T. Pham

[57] ABSTRACT

A substantially sealed case for enclosing objects has at least one openable surface and an inlet-outlet port through a surface of the case, permitting the ingestion and expulsion of air during case thermal expansion and barometric pressure changes. The inlet-outlet port has an inlet passage and an outlet passage therethrough, with a check valve in the inlet passage permitting ingestion of air into the case through an inlet filter and blocking the expulsion of air therethrough. The inlet-outlet port also has a check valve in the outlet passage permits the expulsion of air from the case through an outlet filter and blocks the ingestion of air therethrough. A flexible membrane bag encloses the inlet and outlet filters, and may optionally include air treatment means for controlling the relative humidity and the oxygen content of air in the bag.

13 Claims, 5 Drawing Sheets

SEALED CASE WITH CLOSED-CYCLE FILTER SYSTEM

RELATED APPLICATIONS

A related application was filed by the applicant as Ser. No. 07/908,387, filed Jul. 6, 1992, now abandoned.

BACKGROUND

1. Field of the Invention

This invention applies to cases for protecting objects which are being publicly displayed, such as those used in museums or archival storage or shipping of sensitive artifacts; and more specifically applies to hermetically-sealed, air-tight cases for such applications.

2. Background of the Invention

Display cases are substantially transparent enclosures, usually made of plate glass or acrylic plastic in which objects are displayed for viewing. It is well known that many airborne pollutants, both particulate and chemical, find their way into display cases to contaminate object on display. Typical pollutants are dust, organic and carbon products from automobile exhausts, tires and brakes. Also, "smog" chemicals, include sulfur dioxide, nitrous oxide, carbon monoxide and hydrogen sulfide from catalytic converters. Each patron in an eight-hour day in the area will slough off approximately 1.5 grams of human skin cells, plus clothing fiber particles; and 3.5 cups of saliva containing water vapor and digestion enzymes; and often acetic acid, alcohol vapor mold spores, etc. from recently consumed food or drinks. Added to that list are chlorine and ammonium products used in normal cleaning processes in the building. Chemical and photochemical reactions then combine elements to produce hydrochloric acid, nitric acid and sulfuric acid. Most commercial display cases, even those housing extremely valuable objects that may be damaged by pollutants, are poorly sealed or not sealed at all. Display cases housing very high-priced merchandise in retail stores usually have glass or wood doors with no attempt to seal them at all, and as a result it is necessary to periodically dust, clean and rotate merchandise, with the attendant labor costs. When items on display are too soiled, faded or damaged by the ambient environment entering the cases, it is normal practice for stores to discount and even discard them at substantial annual cost.

Priceless objects in museums are also normally displayed in unsealed or poorly sealed cases. Typical museum cases, known as "vitrines" are comprised of a wooden base on which a five-sided glass or acrylic plastic box rests. As atmospheric pollutants seep into the cases and particulates show up in and on the displays as internal "dust" which is simply the visible accumulation of various chemical and organic pollutants. Then the cases must be opened and thoroughly cleaned. Invisible chemical pollutants in the case cause artifacts to be degraded until they are eventually rotated out of displays.

Unfortunately, the root cause of much internal case pollution it is not well known. The combination of lighting and air conditioning in buildings will cause diurnal-to-nocturnal temperature changes inside display cases. Each time an imperfectly-sealed case is heated by lighting or any other thermal source, the air within a display case expands and exhales through cracks and pores. Each time the unending weather cycles cause the natural barometric pressure to drop a little, the captured higher-pressure air within the case further exhales. Each time patrons view objects on display they radiate heat (approximately 300 watts per person) and breathe out warm air. The temperature increase also causes the case to exhale. Then, as any or all of these forces is reversed; the lights are turned off, the room temperature is lowered by air conditioning, the barometric pressure rises or warm bodies leave the room, the differential pressure inside the case drops to a pressure lower than the ambient external pressure. Then the case literally tries to inhale and suck any particulate or gaseous contaminants in the ambient air into the case. A typical display case slowly exhales during the day and sucks in the surrounding ambient air during the night. Since room cleaning is done after business hours, the vapors from cleaning solvents and particulates from sweeping, dusting and vacuuming are launched into the air just before the normal nocturnally-cooled inhaling mode begins. As a result ingestion of airborne contaminants, the present practice is to open up prior-art display cases periodically, remove all the artifacts, and then clean the interior of the cases and the artifacts. This is extremely expensive, as highly skilled personnel must remove fragile artifacts to accomplish the cleaning. It is also potentially damaging to the artifacts, as ancient materials are often very fragile and may be damaged by the cleaning processes or, if they are made of textiles, paper or other organic materials, even from being moved. Similar, problems exist for cases used for archival storage of pollution-sensitive objects in both museum and in industrial applications.

DESCRIPTION OF PRIOR ART

In order to avoid the foregoing hazards, a few display cases are simply hermetically-sealed (air-tight) rigid boxes, such as the case shown in U.S. Pat. No. 5,127,718. The primary disadvantage of hermetically-sealed cases is that they are heavy and tightly-sealed in order to withstand the stresses of constantly-changing pressure differentials with zero leakage. Hence, they are very expensive. Therefore, rigid, hermetically-sealed cases are impractical for most museums, and for many archival or industrial storage applications.

One method of providing a degree of pollution protection for objects is the case shown in U.S. Pat. No. 4,666,479. This approach eliminates the weight and cost of hermetic sealing by providing a substantially rigid, non-hermetic (not airtight) case with vents including combined chemical and particulate filters to exclude most of the pollution. A nearly identical structure is shown in U.S. Pat. No. 4,951,555, again showing a non-hermetic case having combined chemical and filters installed in the bottom. The primary disadvantage of the structures of both the '479 and '555 Patents is that when used in areas having high visitor traffic, the inlet filter will become rapidly clogged with greasy particulate materials. Further, as in the '555 patent, there is always a slight reverse flow required to close a check valve. During this slight reverse flow, the outlet valve can accumulate particulate materials in its entrance, whereafter the valve will not fully close. One embodiment of the '555 solves the reverse-flow problem by including a positive pressure pump that also recirculates the case air, and entrains some ambient air to create positive-pressure. Thus, the make-up air comes from the surrounding gallery, which is the pollution source. Therefore the filters still tend to get contaminated, particularly in a popular museum that has literally thousands of visitors a day; each visitor tracking in dirt, pollen, etc., and exuding various chemicals from both their bodies and their breath.

The positive pressurization embodiment of the '555 Patent is similar to that shown in the rigid and ventilated case of U.S. Pat. No. 3,148,956. This is done in some museums, but the fan noise and vibration are usually so objectionable that the use of such techniques is rare. A case design for clean assembly that is hermetic (air-tight) in operation is shown in U.S. Pat. No. 1,642,577. This structure relies on an elastomeric bag section to accommodate pressure changes due to manipulation of the sealed gloves. As long as the bag volume is greater than the glove volume, an operator may engage or disengage with the gloves without causing a pressure differential. In addition, a manner similar to that used in the '555 Patent recirculating filter structure, this '577 Patent also has a recirculating air humidifier and treatment system.

OBJECTS AND ADVANTAGES

The primary object of the present invention is to provide cases of relatively inexpensive configurations that permit artifacts to be viewed by many people at a time, while at the same time protecting the artifacts from contamination and damage caused by the ingestion of airborne pollutants. It is a further object of the present invention to provide viewing or archival cases that reduce the ingestion of pollutants. It is yet another object of the present invention to provide a filter system that can be retrofitted to existing cases, converting them to hermetic (air-tight) sealing, whereby there is no air exchanged with the outside ambient area. It is a further object of the invention to provide a case and filter system that passively recirculates air within the case without the use of any motor or pump, whereby the recirculation removes more and more pollutants with each pass through a filter system, to the point that the artifacts are virtually free of the smallest amounts of airborne chemical and particulate contamination. It is also an object of the invention to provide a passive filtering system that is thermally driven so as to operate efficiently and silently, without the need for a fan.

SUMMARY

The objects of the invention are accomplished by providing a case closed-cycle filter system providing the advantages of a hermetically-sealed case for enclosing artifacts with at least one openable surface and an inlet-outlet port through a surface of a rigid portion of the case, permitting the ingestion and expulsion of air during case temperature and barometric pressure changes. The inlet-outlet port has an inlet passage and an outlet passage. A check valve in the inlet passage permits the ingestion of air into the case through an inlet filter and blocks the expulsion of air. A check valve in the outlet passage permits the expulsion of air from the case through an outlet filter and blocks the ingestion of air. A flexible membrane bag portion of the case encloses the inlet and outlet filters. In a first preferred embodiment the flexible membrane bag portion includes air treatment means, replaceable through a resealable opening in the bag, for controlling the relative humidity and the oxygen content of air in the bag.

Figure 1:
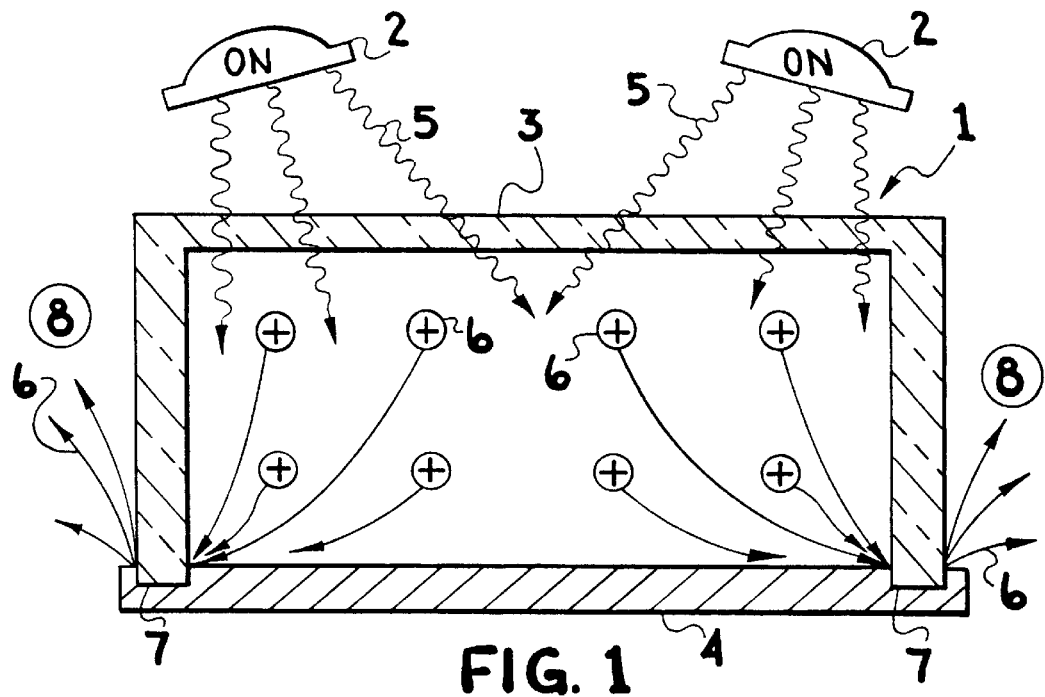
FIG. 1 is a simplified cross-sectional view of a prior-art display case, shown during a diurnal heating cycle.

| REFERENCE NUMERALS IN DRAWINGS | | | |
|---|---|---|---|
| 1 | prior art | 10 | present case |
| 2 | lights | 12 | rigid case portion |
| 3 | bonnet | 13 | bonnet |
| 4 | openable surface | 14 | openable surface |
| 6 | case air | 15 | inlet-outlet port |
| 6f | filtered air | 16 | outlet check valve |
| 6ff | twice-filtered air | 17 | outlet filter |
| 6ft | filtered air | 18 | flexible bag |
| 6ftf | twice-filtered, treated air | 18a | reseable closure |
| 7 | joints | 19 | inlet filter |
| 8 | gallery air | 20 | inlet check valve |
| 8p | polluted air | 22 | desiccant |
| | | 23 | getter |

DESCRIPTION OF THE PREFERRED EMBODIMENTS

In FIG. 1 a prior-art display case 1 is shown during typical diurnal heating by typical overhead lights 2, wherein case 1 comprises a bonnet 3 for enclosing objects, substantially sealed against an openable surface 4. The diurnal lamp heat, supplemented by the body heat of visitors (not shown), expands air 6, creating positive pressure and forcing it out of the case through joints and cracks 7 into the surrounding gallery air 8. During diurnal operations visitors track in and breathe out various pollutants that are suspended in the now visitor-polluted air 8p by Brownian motion of air molecules.

Figure 2:
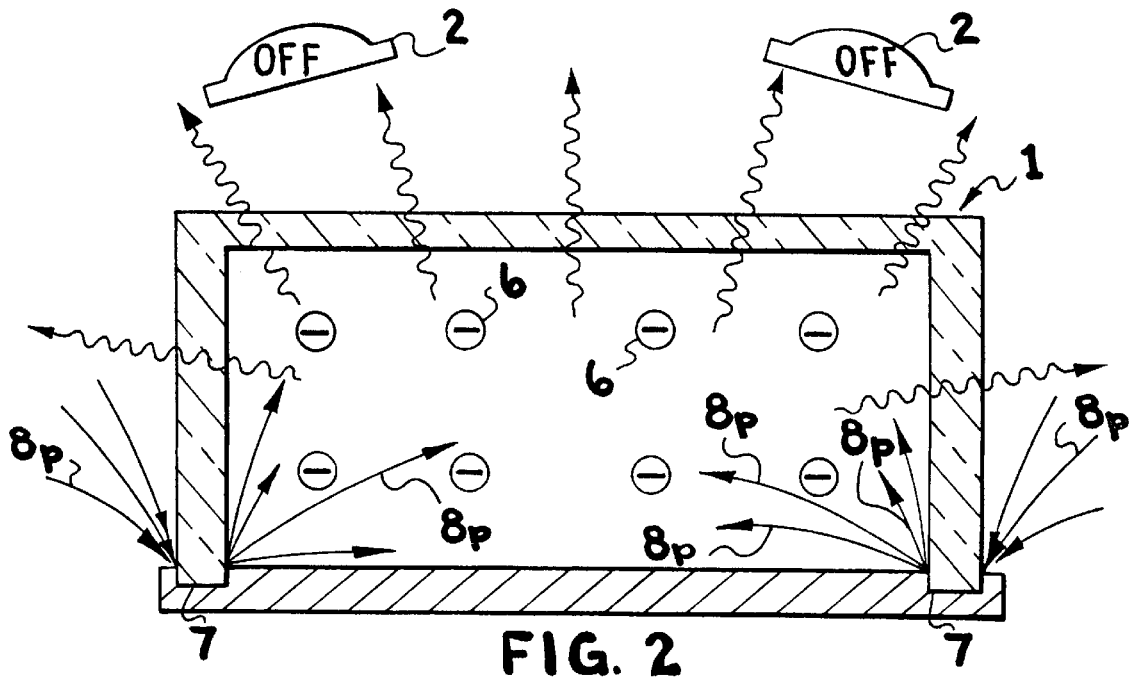
FIG. 2 is a simplified cross-sectional view of the prior-art display case of FIG. 1, shown during a nocturnal cooling cycle.

In FIG. 2 the prior-art display case 1 of FIG. 1 is shown during nocturnal cooling as overhead lights 2 are turned off and visitors leave the gallery. Then the diurnally-heated air 6 subsides, creating negative pressure in the case and drawing polluted air 8p from the surrounding gallery through joints and cracks 7.

Figure 3:
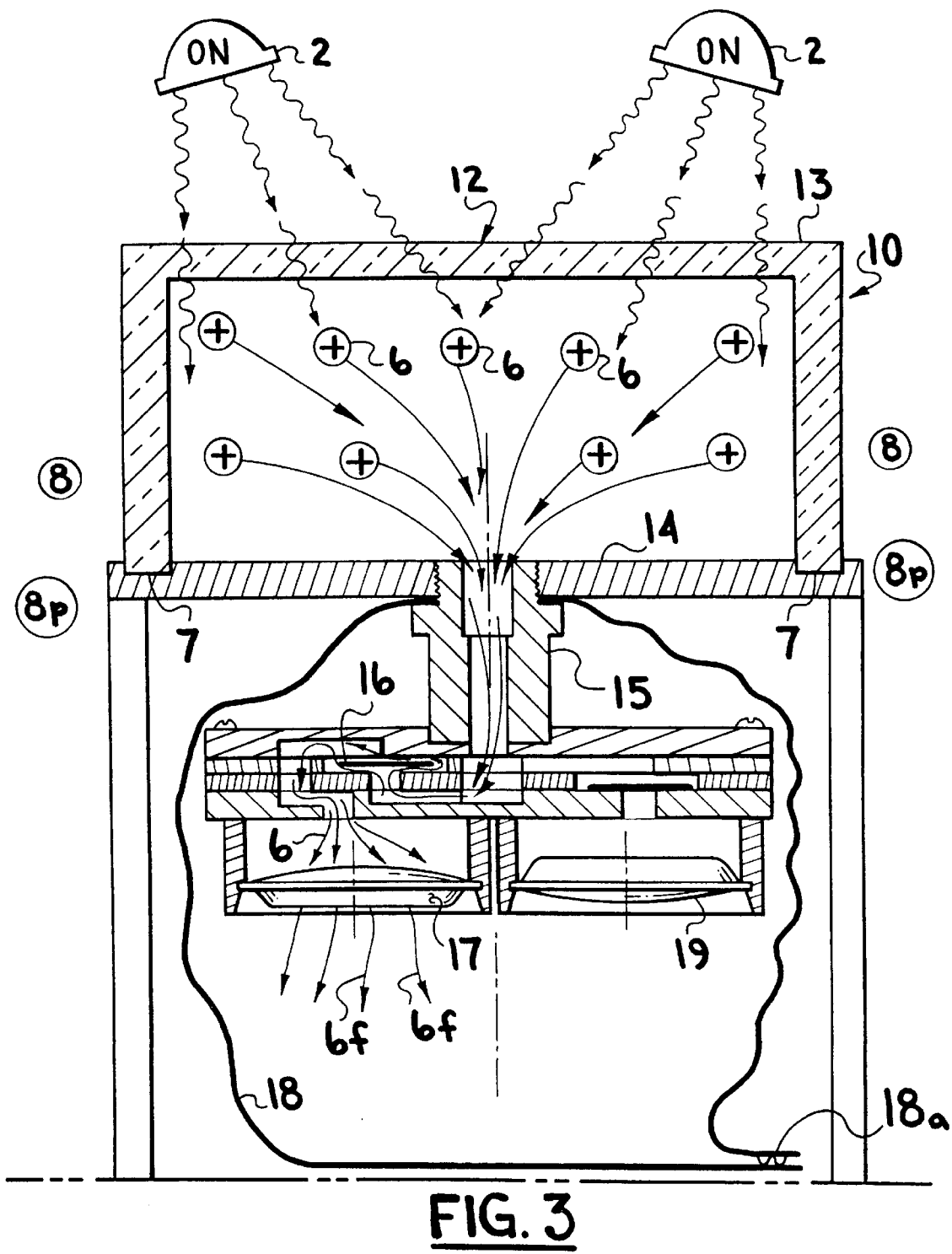
FIG. 3 is a simplified cross-sectional view of a first preferred embodiment of a case and filter system according to the present invention, and, shown during a diurnal heating cycle.

In FIG. 3 a closed-cycle case filter system 10 according to the present invention is shown during typical diurnal heating, wherein system 10 includes a substantially sealed case 12 for enclosing objects, schematically shown as a transparent bonnet 13, and has at least one openable surface 14. An inlet-outlet port 15 is shown extending through a lower (openable) surface 14 of the case, permitting the expulsion of heated and expanding air 6 through inlet-outlet port 15, through an outlet check valve 16 and an outlet filter 17. Outlet air then emerges as filtered air 6f within and partially inflating a flexible membrane bag 18 having a resealable closure 18a shown as a common "zip-lock" plastic bag closure. A wide variety of specific filters are commercially available to suit the needs of various exhibits. Since various materials tend to outgas chemical vapors, outlet filter 17 would be selected to absorb the vapors associated with each specific material, such as selecting a filter to absorb formaldehyde outgassed from wood products. The free flow of air 6 through inlet-outlet port 15, outlet check valve 16 and filter 17 provide a path for filtered air 6f into bag 18, so there is no pressure differential at any joints or cracks 7. Thus, no air is expelled into gallery air 8, which due to the influx of visitors during the day becomes polluted air 8p.

Figure 4:
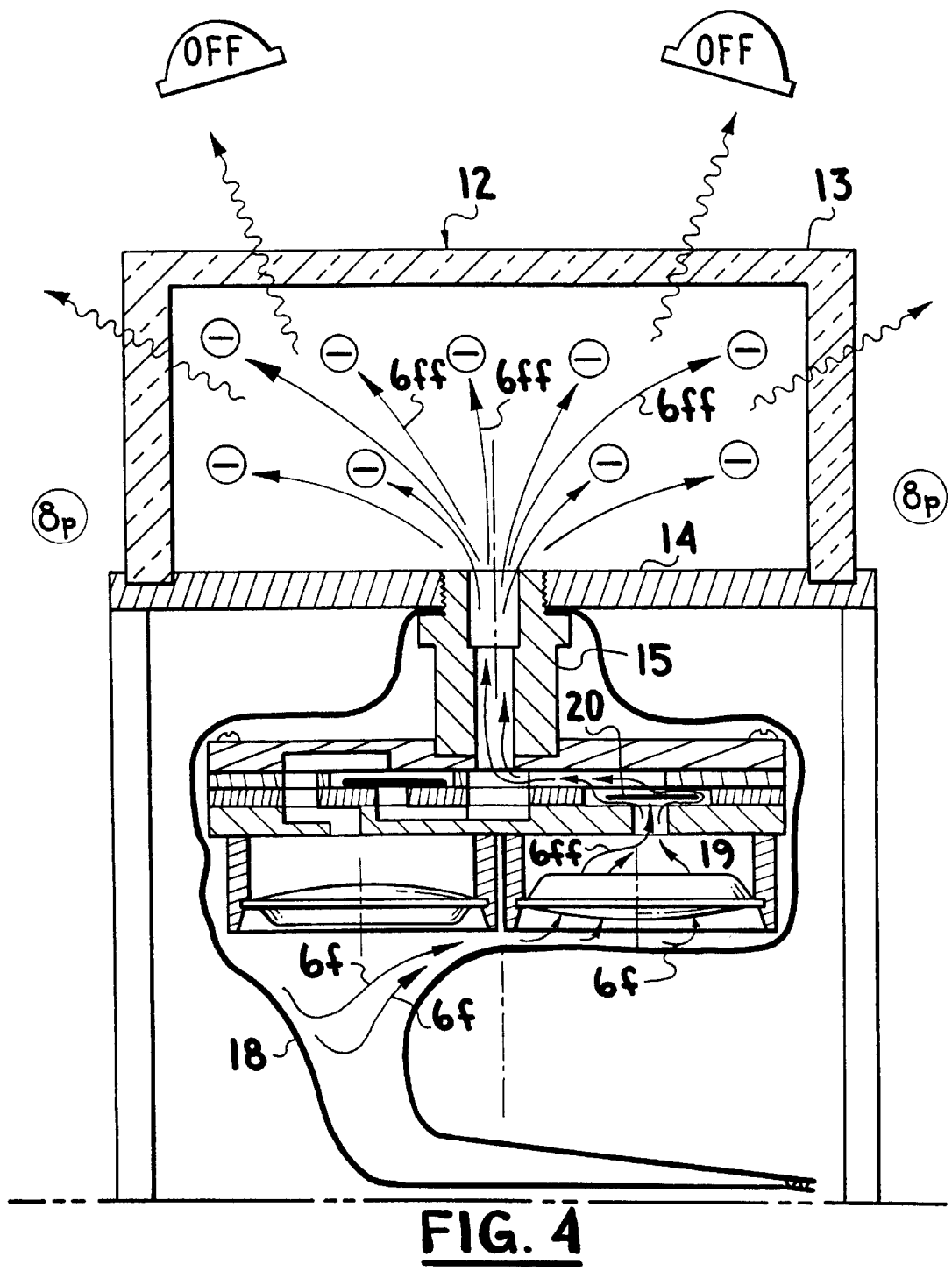
FIG. 4 is a simplified cross-sectional view of the case and filter system of FIG. 3, shown during a nocturnal cooling cycle.

In FIG. 4 the closed-cycle case filter system 10 of FIG. 3 is shown during nocturnal cooling. With lights 2 turned off and with the visitors gone from the gallery the case radiates its heat into the gallery. The diurnally-heated air 6 cools and subsides in volume, freely drawing filtered air 6f back through inlet filter 19 as twice-filtered air 6ff through inlet check valve 20, so twice-filtered air 6ff enters the case. The inlet filter 19 is also selected to match the needs of the exhibit materials. Since there is a free path from the inside of bag 18 to the inside of case 12, air can move from the bag to the case without creating a differential pressure across and joints or cracks 7. Thus, there is no mechanism to draw polluted air 8p from the surrounding gallery through joints and cracks 7 into case 12.

Figure 5:
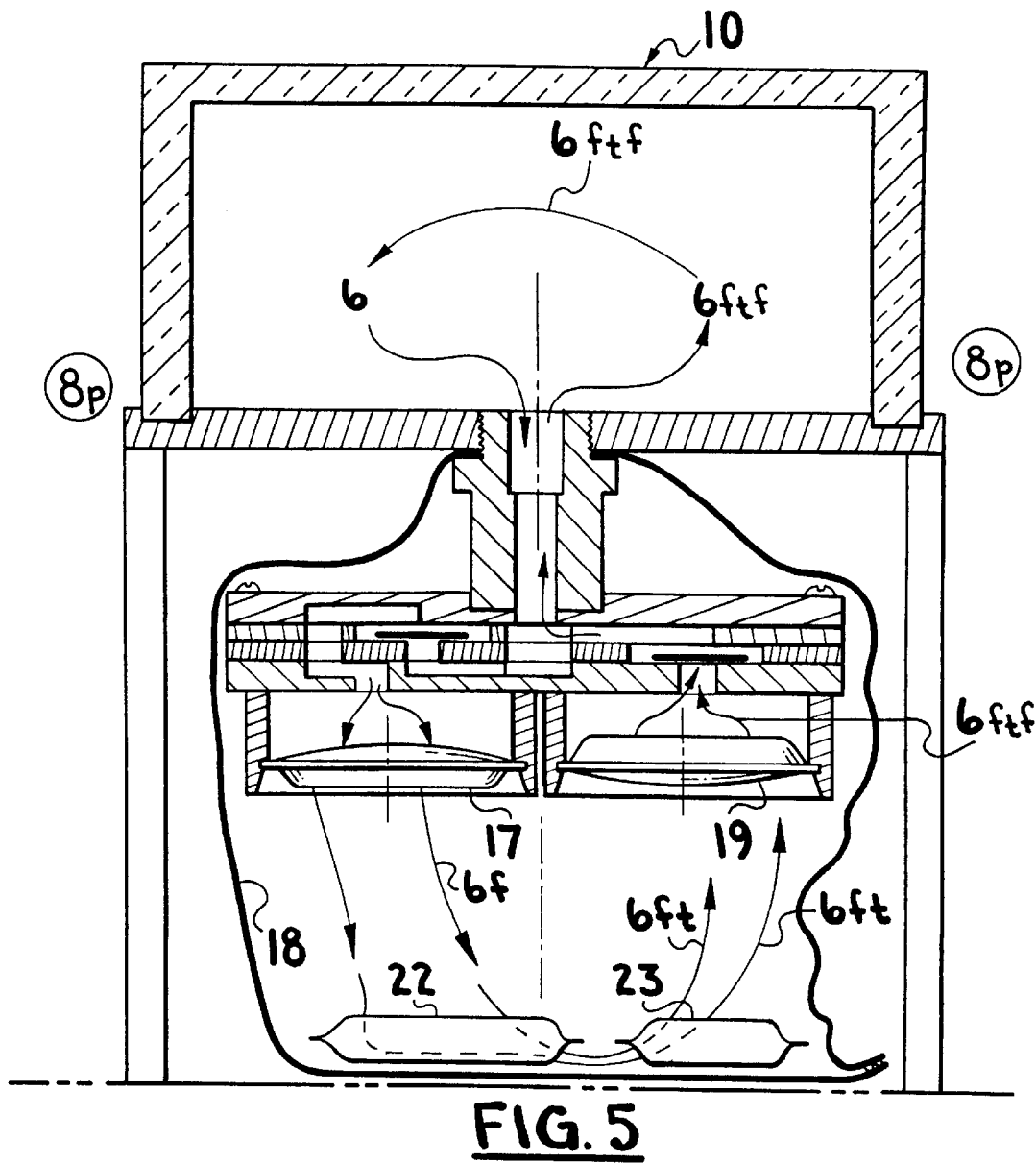
FIG. 5 is a simplified cross-sectional view of the case and filter system of FIGS. 3 and 4, shown including air treatment means.

In FIG. 5 the closed-cycle case filter system 10 of FIGS. 3 and 4 is shown having filtered outlet air 6f filling flexible bag 18. Air 6f is shown being humidity treated by containers of desiccant material 22 and oxygen reduced by getter material 23 before returning as filtered and treated air 6ft through inlet filter 19. The air now is again filtered by inlet filter 19 to emerge as twice-filtered treated air 6ftf. Selection of the inlet filter 19 may be based on the properties of the desiccant and getter materials, which often contain micron-size particulate materials removable the inlet filter 19. Thus, on a daily basis the expanding air 6 in case 10 serves to circulate case air through outlet filter 17, which is selected to primarily remove chemical vapors outgassed from case construction materials or artifacts, to partially inflate flexible membrane bag 19. Filtered air 6f is then treated by desiccants 22 and/or getters 23 to become filtered and treated air 6ft within bag 18. Nocturnal cooling then causes the air in case 12 to subside, returning air through inlet filter 19 to the case 12 as filtered, treated and re-filtered air 6ftf.

Figure 6:
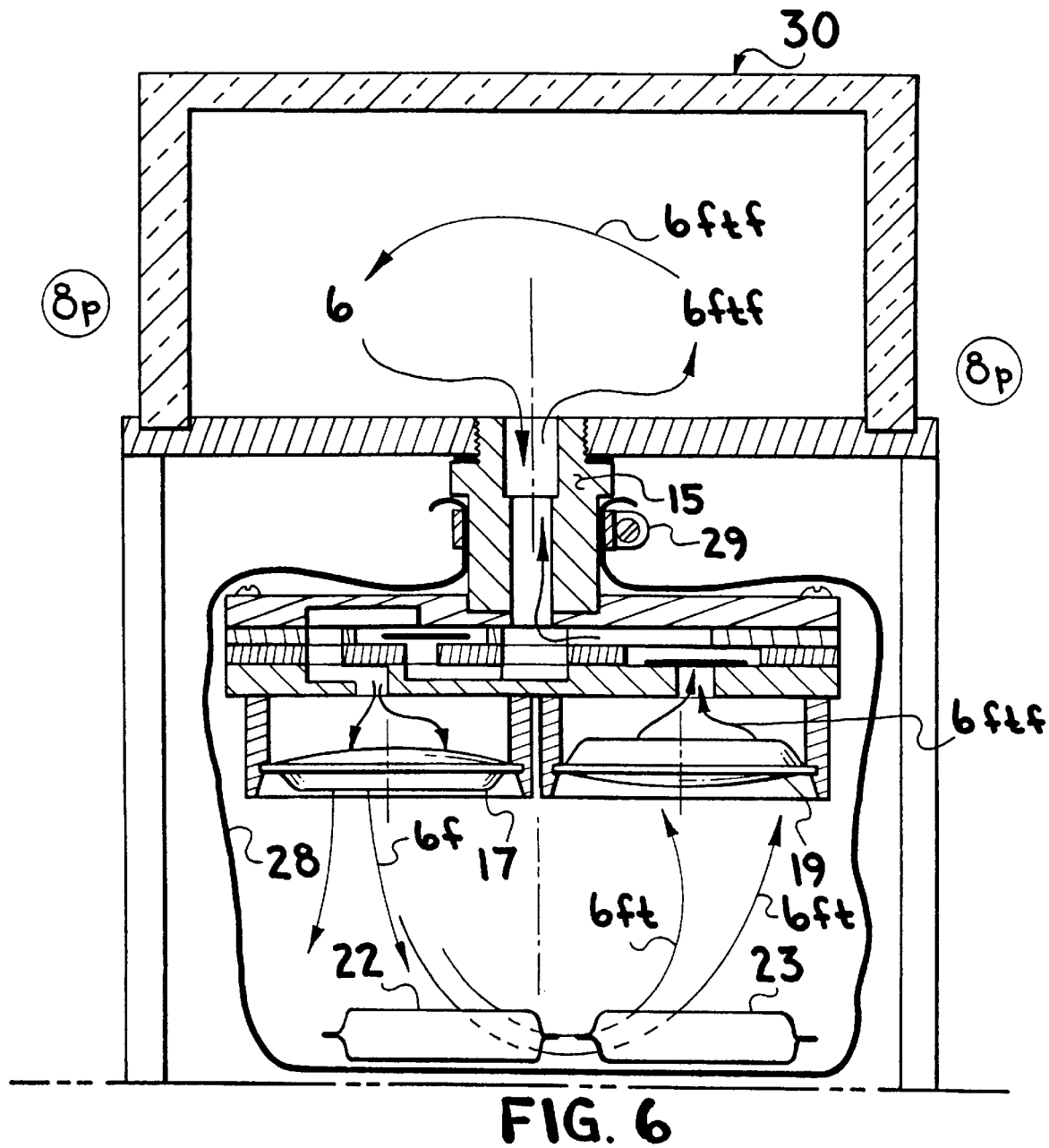
FIG. 6 is a simplified cross-sectional view of a second preferred embodiment of the invention, including a gathered and clamped flexible membrane bag.

In FIG. 6 a simplified cross-sectional view of a second preferred embodiment 30 of the invention is shown, including a gathered and clamped flexible membrane bag 28. This embodiment is functionally identical to that of FIG. 3, with the exception that of the bag configuration is much like a conventional plastic trash bag and the resealable closure comprises gathering the open end of the bag around inlet-outlet port 15 and clamping the bag with a circular clamp 29. Clamp 29 is shown as a hose clamp, but the function may be performed by devices as simple as a wire "twist-tie" or even a rubber band.

Operation

As describe and shown in the foregoing detailed description of the drawings, the mechanism of expansion and contraction of air that causes the ingestion of pollutants in prior-art cases, becomes the mechanism that constantly filters and purifies the air in the present invention. Each diurnal heating cycle moves air from the rigid portion of the case into the flexible membrane bag portion without causing increased pressure with respect to the surrounding gallery. Then, each following nocturnal cycle returns the air in the bag portion of the case to the rigid portion of the case, instead of sucking in polluted air from the gallery. The present invention permits economical manufacture of hermetically sealed cases and also permits retrofitting of filters and less-than-perfect seals on existing prior art cases for museum artifact displays, archival storage and even industrial storage and transportation. A most important operating advantage is that the air may be filtered, humidity controlled and even oxygen controlled while in the bag portion, whereby only pure, pollution-free air with proper humidity is allowed to enter the rigid portion of the case containing the artifacts.

Summary, Ramifications and Scope

The objects of the invention are thus accomplished by providing a case with a closed-cycle filter system, providing the advantages of a hermetically-sealed case for enclosing artifacts with at least one openable surface and an inlet-outlet port through a surface of a rigid portion of the case, permitting the ingestion and expulsion of air during case temperature and barometric pressure changes. The inlet-outlet port has an inlet passage and an outlet passage. A check valve in the inlet passage permits the ingestion of air into the rigid portion of the case through an inlet filter and blocks the expulsion of air. A check valve in the outlet passage permits the expulsion of air from the rigid portion of the case through an outlet filter and blocks the ingestion of air. A flexible membrane bag portion of the case encloses the inlet and outlet filters, thereby comprising a hermetically-sealed (air-tight) case. In a first preferred embodiment the flexible membrane bag portion includes air treatment means, replaceable through a resealable opening in the bag portion, for controlling the relative humidity and the oxygen content of air in the case system. In a preferred embodiment the outlet passage includes a chemical vapor filter for removing such vapors as may be outgassed from the artifacts or rigid case portion, and the inlet passage includes a particulates filter for removing particulates that may exist in the system or may be emitted by desiccants or getters.

It will be obvious to anyone skilled in the art that the principles and construction of the present invention are applicable to a wide variety of cases, both for display, archival use and for clean industrial use, providing essentially zero leakage, but having passive recirculation the provides continuous purification and cleaning of the air. It will also be apparent to one skilled in the art that there are any number of structural variations that can perform the same manifolding, valving and filtering functions disclosed herein, and which are considered obvious variants within the scope of this invention.

We claim:

1. A closed-cycle case filter system including:
   an air-tight, substantially hermetically-sealed case for enclosing objects including a rigid case portion having at least one openable surface;
   an inlet-outlet port through a surface of the rigid case portion, permitting the ingestion and expulsion of air during temperature and barometric pressure changes said port having an inlet passage and an outlet passage therethrough;
   an inlet check valve in the inlet passage permitting the ingestion of air into the rigid case portion through an inlet filter and blocking the expulsion of air therethrough;
   an outlet check valve in the outlet passage permitting the expulsion of air from the rigid case portion through an outlet filter and blocking the ingestion of air therethrough; and
   a membrane bag flexible case portion enclosing the inlet and outlet filters.

2. A case according to claim 1 in which the flexible membrane bag portion includes air treatment means for controlling the relative humidity of air in the bag.

3. A case according to claim 1 in which the flexible membrane bag portion includes air treatment means for controlling oxygen content of air in the bag.

4. A case according to claim 1 in which the rigid case portion is a display case having at least one viewing surface.

5. A case according to claim 1 in which the flexible membrane bag portion includes a resealable opening for replacing the inlet and outlet filters.

6. A case according to claim 2 or 3 in which the flexible membrane bag portion includes a resealable opening for replacing the air treatment means.

7. A case according to claim 6 in which the resealable opening means is an interlocking plastic zipper.

8. A case according to claim 7 in which the resealable opening means is an open end gathered and clamped around the inlet-outlet port.

9. A closed-cycle filter system for a case for displaying objects including:
- an inlet-outlet port installable through a surface of a case, permitting the ingestion and expulsion of air during temperature and barometric pressure changes in said case, said port having an inlet passage and an outlet passage therethrough;
- an inlet check valve in the inlet passage permitting the ingestion of air into the rigid case portion through an inlet filter and blocking the expulsion of air therethrough;
- an outlet check valve in the outlet passage permitting the expulsion of air from the rigid case portion through an outlet filter and blocking the ingestion of air therethrough; and
- a flexible membrane bag enclosing said inlet and outlet filters.

10. A closed-cycle case filter system including:
- a hermetically-sealed case for enclosing objects including a rigid case portion having at least one openable surface;
- an inlet-outlet port through a surface of the rigid case portion, permitting the ingestion and expulsion of air during temperature and pressure changes, said port having an inlet passage and an outlet passage therethrough;
- an inlet check valve in the inlet passage permitting the ingestion of air into the rigid case portion through an inlet filter and blocking the expulsion of air therethrough;
- an outlet check valve in the outlet passage permitting the expulsion of air into the rigid case portion through an inlet filter and blocking the ingestion of air therethrough; and
- a membrane bag case portion enclosing the inlet and outlet filters.

11. A closed-cycle case filter system including:
- a hermetically-sealed case for enclosing objects including a rigid case portion having at least one openable surface;
- an inlet passage and an outlet passage, each connected to the interior of the rigid case portion;
- an inlet check valve in the inlet passage permitting the ingestion of air into the rigid case portion through an inlet filter and blocking the expulsion of air therethrough;
- an outlet check valve in the outlet passage permitting the expulsion of air into the rigid case portion through an inlet filter and blocking the ingestion of air therethrough; and
- a membrane bag case portion enclosing the inlet and outlet filters.

12. A closed-cycle case filter system including:
- a hermetically-sealed case for enclosing objects including a rigid case portion having at least one openable surface;
- an inlet passage and an outlet passage, each connected to the interior of the rigid case portion;
- an inlet check valve in the inlet passage permitting the ingestion of air into the rigid case portion through a filter and blocking the expulsion of air therethrough;
- an outlet check valve in the outlet passage permitting the expulsion of air into the rigid case portion through a filter and blocking the ingestion of air therethrough; and
- a membrane bag case portion enclosing the inlet and outlet filters.

13. A closed-cycle case filter system according to claims 10, 11 or 12 and including means for enclosing air treatment materials within the membrane bag.

\* \* \* \* \*